Aug. 28, 1951     J. C. WEAVER     2,566,007
EMERGENCY WHEEL
Filed Oct. 24, 1947
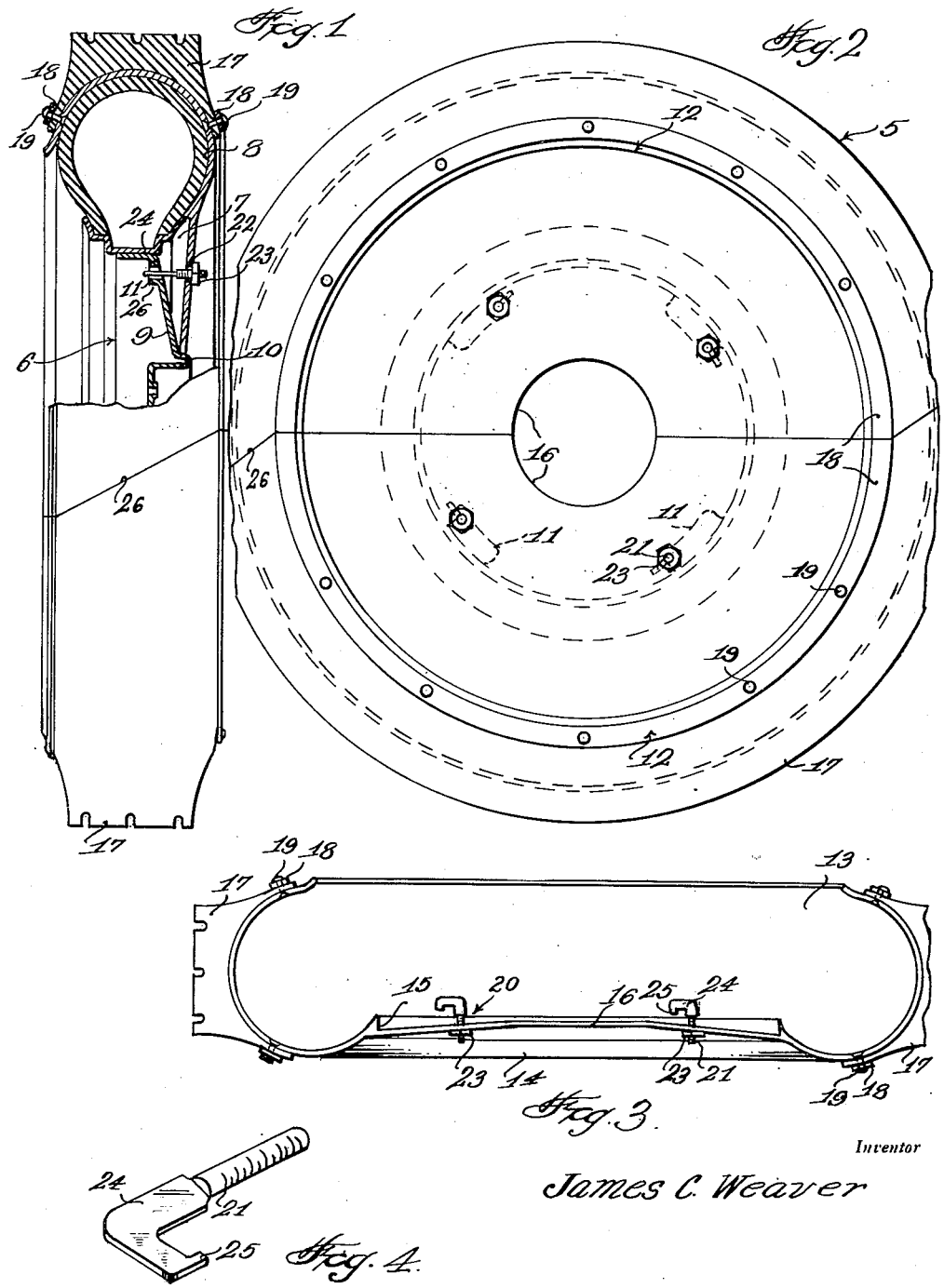
Inventor
James C. Weaver
By Randolph & Beavers
Attorneys Patented Aug. 28, 1951

2,566,007

UNITED STATES PATENT OFFICE 2,566,007

EMERGENCY WHEEL

James C. Weaver, Harrisburg, Pa., assignor of twenty per cent to J. B. Brownawell, twenty per cent to Lewis E. Eckenrode, twenty per cent to George C. Atkinson, twenty per cent to John Leonzo, and twenty per cent to Samuel Snyder, all of Harrisburg, Pa.

Application October 24, 1947, Serial No. 781,888

4 Claims. (Cl. 301—38)

This invention relates to an emergency wheel constructed and arranged to be quickly applied to or removed from a conventional motor vehicle wheel and having a portion disposed around a puneumatic tire of the vehicle wheel and substantially rigidly disposed with respect to said vehicle wheel whereby the wheel can be utilized with a deflated tire for the purpose of driving to a service station or elsewhere where repair of the tire can be conveniently accomplished.

More particularly, it is an aim of the present invention to provide an emergency wheel which will eliminate the necessity of changing a tire and wheel in the case of a puncture, blow-out or flat tire thereby eliminating the need of jacking up the car and other labor incidental to the conventional changing of a tire and wheel.

Still another object of the invention is to provide an emergency wheel formed of sections capable of being quickly applied to or removed from a vehicle wheel while in its normal position and without jacking up the wheel.

A further object of the invention is to provide an emergency wheel of a simple and durable construction having novel means to enable it to be quickly and easily applied to or removed from a conventional vehicle wheel.

Various other objects and advantages of the invention will hereinafter become more fully apparent from the following description of the drawing, illustrating a presently preferred embodiment thereof, and wherein:

Figure 1 is an edge elevational view, partly in vertical section showing the emergency wheel applied to a conventional vehicle wheel;

Figure 2 is a side elevational view thereof looking toward the outer side of the emergency wheel;

Figure 3 is a plan view looking toward the inner side of one of the two sections of the emergency wheel, and Figure 4 is a perspective view of one of the improved fastening elements for attaching the invention to a vehicle wheel.

Referring more specifically to the drawing, for the purpose of illustrating a preferred application and use of the emergency wheel, comprising the invention and designated generally 5, a portion of a conventional motor vehicle wheel is shown at 6 including a rim 7 for mounting a pneumatic tire 8 and which is fixed to the outer portion of the wheel body 9. The wheel body 9, adjacent the center thereof is provided with an annular outwardly facing inclined shoulder 10 against which a hub cap, not shown, normally bears. The body portion 9 of the wheel 6 is also provided with circumferentially spaced, circumferentially elongated openings 11 formed therein, adjacent the rim 7. The wheel parts 6 to 11 are all of conventional construction and form no part of the present invention but have been illustrated and described merely to better disclose the application and use of the emergency wheel 5 as will hereinafter become more fully apparent.

The wheel 5 is formed of corresponding wheel sections 12 of substantially identical construction and each of which includes a substantially semicircular peripheral portion 13 which is formed of a relatively rigid metal and which is likewise of substantially semi-circular cross section, as best illustrated in Figures 1 and 3. One side of the peripheral portion 13 is provided with an integral extension or wall 14 having an inwardly projecting arcuate shoulder 15, adjacent the peripheral portion 13, and is provided with a semicircular, centrally disposed recess 16. The member 13, 14 is formed of steel or other rigid material and the peripheral portion 13 thereof is provided on its external convex side with a tread member 17 formed of rubber and provided with side wall portions and a concave inner side which fits over the peripheral portion 13 and is secured thereto by semi-circular metal bands 18 which are fastened at spaced intervals to the peripheral portion 13 by rivets 19 which extend therethrough and through the peripheral portion 13 and the side wall portions of the tread member 17. The tread members 17 may be formed from the casing of a worn pneumatic tire by cutting off the rim engaging beads thereof and provides a ground engaging covering for the peripheral portion 13 which affords a certain amount of resiliency thereto.

As best seen in Figures 3 and 4, the wall 14 of each wheel section 12 carries two retaining fastenings, designated generally 20, each of which includes a threaded bolt 21 which extends loosely through an opening 22 thereof and which carries a nut 23 on its outer end and for bearing engagement against the outer side of said wall 14. Each bolt 21 is provided at its inner end with a flat, relatively wide hooked shaped extension 24 which is adapted to extend through one of the openings 11 and which is circumferentially movable with its section 12 for engaging the bill 25 of the hook 24 around one end of the internal bead 26 of the opening 11, as seen in Figure 1. The hook portion 24 is engaged with an end of the opening 11 with the nut 23 loosened, after which said nut is tightened on the bolt 21 for securely engaging the hook bill 25 behind an end of the flange or bead 26 of said opening 11 and for drawing the wall portion 14 of the wheel section 12 inwardly of the wheel 6. The hooks 24 are of a width greater than the radial width of the openings 11 to prevent the bolts and hooks from rotating therein when the nuts 23 are tightened. When the nuts 23 are thus tightened, as seen in Figure 1, the shoulder 15 of section 12 being applied is drawn into position to engage over the outer edge of the rim 7 and at the same time the semi-circular recess 16 thereof is drawn into flush engagement with one-half of the annular shoulder 10 of the wheel 6 and said semi-circular edge of the recess 16 by bearing engagement with the shoulder 10 supports the weight of the load on the wheel section 12 as transmitted through the wheel 6.

One of the sections 12 is first applied to the upper half of the vehicle wheel 6, as just previously described, after which the vehicle is driven forward or rearward a distance to cause the wheel 6 to execute approximately one half a revolution to thereby move said section 12 into a lowermost position and so that the wheel 6 and tire 8 will be supported thereon and while the other section 12 is applied to the then upper half of the wheel 6 preparatory to driving the vehicle on the emergency wheel 5 to a service station or other place of repair. As best illustrated in Figures 1 and 2, the ends of the peripheral portions 13 and of the tread members 17 are cut so as to fit together on a line 26 which is diagonal to a transverse line across the periphery of the emergency wheel and so that said joints 26 will move into and out of engagement with a roadway or other surface progressively to prevent the joints thus formed producing a noise and bump as they strike a road surface.

Obviously, the number, size and shape of the fastenings 20 may be varied depending upon the number, size and shape of the wheel openings 11 and various other modifications and changes are likewise contemplated and may obviously be resorted to without departing from the spirit or scope of the invention as hereinafter defined by the appended claims.

I claim as my invention:

1. In combination with a disk-type vehicle wheel provided with an annular outwardly extending central hub surrounding flange and having a plurality of circumferentially elongated openings adjacent the rim thereof, an emergency wheel formed of corresponding sections each including a substantially semi-circular peripheral portion disposed around one-half of a deflated pneumatic tire which is mounted on the vehicle wheel rim and having an integral side wall constituting an integral extension of one side edge of said peripheral portion, said peripheral portion being arch-shaped in cross section and opening inwardly to receive the tire, said side wall having a recessed portion engaging against a part of said annular hub surrounding flange of the wheel, a plurality of hooks each engaging the inner side of the vehicle wheel and each having a shank extending loosely through one of the wheel openings, means for detachably and adjustably connecting each shank to the side wall of its emergency wheel section, said hooks retaining the wheel sections in engagement with the vehicle wheel and the recessed portions thereof in engagement with the hub surrounding wheel flange, said hooks being disengageable from the vehicle wheel through the openings thereof.

2. An emergency wheel as in claim 1, each of said hooks having a flat elongated head disposed at a right angle to the hook shank and a bill portion extending at an angle from the end of the flattened portion remote from the hook shank and in the same direction as said hook shank.

3. An emergency wheel as in claim 1, said emergency wheel sections having abutting edge portions, and the abutting edge portions of the peripheral portions of said wheel sections extending diagonally to the periphery of the emergency wheel.

4. An emergency wheel as in claim 1, the side wall of each emergency wheel section having an internal arcuate shoulder engaging the outer edge of the outer flange of the wheel rim and combining with said hooks to retain the wheel sections in engagement with the hub surrounding flange of the vehicle wheel whereby the load on the emergency wheel section will be supported by said hub surrounding flange.

JAMES C. WEAVER.

REFERENCES CITED

The following references are of record in the file of this patent:

UNITED STATES PATENTS

| Number | Name | Date |
|---|---|---|
| 1,066,861 | Stewart | July 8, 1913 |
| 1,263,375 | Clarke | Apr. 23, 1918 |
| 1,753,519 | Kanner | Apr. 8, 1930 |
| 1,791,293 | Steinberg | Feb. 3, 1931 |
| 2,057,607 | Capehart | Oct. 13, 1936 |

FOREIGN PATENTS

| Number | Country | Date |
|---|---|---|
| 357,616 | France | Jan. 8, 1906 |